United States Patent [19]

Hansen et al.

[11] Patent Number: 5,308,546
[45] Date of Patent: May 3, 1994

[54] PHOSPHORESCENT TOY GEL COMPOSITION AND METHODS OF MANUFACTURE

[75] Inventors: Gary L. Hansen; Richard E. Trapp, both of Salt Lake City; Robert B. Clay, Bountiful, all of Utah

[73] Assignee: Glow-Tec, Sandy, Utah

[21] Appl. No.: 803,592

[22] Filed: Dec. 9, 1991

[51] Int. Cl.$^5$ ............................................. C09K 11/02
[52] U.S. Cl. ............................ 252/301.36; 252/301.33; 252/301.34; 252/315.3; 446/219; 446/385; 446/491; 446/901; 106/208; 106/209
[58] Field of Search ............... 252/301.36, 301.33, 252/301.34, 315.3; 446/219, 385, 491, 901; 106/208, 209

[56] References Cited

U.S. PATENT DOCUMENTS

| Re. 32,834 | 1/1989 | Cordts et al. | 524/310 |
|---|---|---|---|
| 264,918 | 9/1882 | Balmain | 252/301.36 |
| 2,180,508 | 11/1939 | De Fraine | 252/301.36 |
| 2,303,097 | 11/1942 | Townsend et al. | 43/44 |
| 2,449,880 | 9/1948 | Cox | 176/122 |
| 2,932,572 | 4/1960 | Sarich, Jr. | |
| 3,061,572 | 10/1962 | Packer | 446/385 |
| 3,359,114 | 12/1967 | Witteman et al. | |
| 3,390,478 | 7/1968 | McKnight et al. | 43/17.6 |
| 3,428,459 | 2/1969 | Hinds | |
| 3,591,389 | 7/1971 | Schneider | 426/271 |
| 3,607,294 | 9/1971 | Ernstrom | |
| 3,607,295 | 9/1972 | Morgan | |
| 3,634,280 | 1/1972 | Dean | 252/301.36 |
| 3,661,790 | 5/1972 | Dean | 252/301.36 |
| 3,751,846 | 8/1973 | Benjamin, Sr. | 46/1 |
| 3,935,659 | 2/1976 | McCallum | 43/17.6 |
| 3,936,970 | 2/1976 | Hodges | 43/17.6 |
| 4,251,547 | 2/1981 | Liggett | 426/1 |
| 4,341,565 | 7/1982 | Martenson | 106/475 |
| 4,486,460 | 12/1984 | Kienast et al. | 427/4 |
| 4,618,213 | 10/1986 | Chen | 524/476 |
| 4,735,660 | 4/1988 | Cane | 106/208 |
| 4,764,383 | 8/1988 | Brown et al. | 426/1 |
| 5,018,532 | 5/1991 | Etheredge, III | 128/844 |
| 5,019,601 | 5/1991 | Allen | 523/122 |

FOREIGN PATENT DOCUMENTS 788999 4/1935 France.

Primary Examiner—Prince Willis, Jr.
Assistant Examiner—Alan D. Diamond
Attorney, Agent, or Firm—Workman, Nydegger & Jensen

[57] ABSTRACT

The phosphorescent toy gel composition is produced by suspending phosphorescent particles in an aqueous solution, thickened with guar gum and crosslinked by a borate compound. The method for manufacturing the phosphorescent gel composition comprises, in one aspect, the steps of providing a water-based solution with a borate ion-containing compound dissolved in the water, providing guar gum and phosphorescent particles suspended and dispersed in propylene glycol, and mixing the water-based solution and the propylene glycol dispersion in a proportion to provide a phosphorescent gel composition.

38 Claims, No Drawings

PHOSPHORESCENT TOY GEL COMPOSITION AND METHODS OF MANUFACTURE

FIELD OF THE INVENTION

This invention relates to moldable toy compositions for the entertainment of children and more particularly to toy gel compositions which glow in the dark after exposure to light.

BACKGROUND OF THE INVENTION

Pliable toy compositions for the entertainment of children which consist of bulk blocks or globs of molding material have been available for many years. The consistency of these toys has ranged from modeling clay for making sculptures and models to slimy gels which children may squeeze and stretch.

Modeling clay consists of a very firm, but deformable putty material which will hold its shape while the sculptor forms or carves figures of animals, people, or structures. The attributes of clay putties are derived from the fine particulate clays held in a matrix by various nonaqueous binders. Particulate clay matter comprises a major percentage of the composition of clay putties. While modeling clay is useful in applications requiring a formable substance capable of retaining a shape, modeling clay lacks the degree of elasticity, coherence, and dilatency present in more pliable compositions.

In addition, clay particles block the passage of light through the composition, thereby preventing the attribution of any phosphorescent character which might be desired in the clay.

Pliable toy compositions which are slightly more soft and tractable than clay are often referred to as doughs. Doughs can be extruded through dies into long ropes or rolled into flat cakes which can be cut with "cookie cutters." These products tend to dry out very quickly and like clay putties, do not exhibit the degree of elasticity, coherence and dilatency provided by more pliable compositions.

An even more pliable toy composition is often referred to as a "gel." Gel compositions are aqueous compositions thickened with gums, starches, resins or fine silica. The rheology of the composition may vary widely depending on the thickening agents used and the additives present.

SUMMARY OF THE INVENTION

In accordance with the present invention, there is provided a phosphorescent toy gel composition which has a stretchable, non-sticky consistency. The gel has a healable property so that if pulled apart, upon manipulation it will re-adhere. The composition is formulated of a heavily thickened aqueous solution which is gelled with a migrating, rehealable crosslinker to provide a thick, soft consistency which can be stretched and molded. The formulation provides phosphorescent particles to be suspended in the composition. The near absence of other solids in the composition allows the passage and emission of light to and from the phosphorescent particles.

One property of the present invention provides a rheology allowing the composition to be formed into various shapes, molded and squeezed between the fingers. Another property of the gel is its cohesive nature which allows it to be stretched into long fine strands or stretched into thin membranes without breaking. A still further property of the toy gel composition is its ability to bounce when thrown against a solid flat surface. This indicates a dilatent characteristic which resists quickly applied forces and causes rebound rather than flow upon impact.

Yet another property of the invention is exhibited after the gel is exposed to bright light. Such exposure initiates a phosphorescent glow that continues for some hours. Phosphorescence is provided by the addition of a small percentage of a particulate metal sulfide, preferably zinc sulfide containing a minor portion of copper sulfide. Other sulfides such as cadmium are used to vary the color of the phosphorescence. The toy gel compositions have the ability to quickly absorb light and then glow, emitting the light over an extended period of time after exposure to light.

The toy gel composition's consistency is provided by a natural or modified guar gum thickening agent in an aqueous solution crosslinked with a borate ion. The crosslinking borate ion is provided by a borate salt, boric acid, or a mixture thereof. Optimum gel consistency is obtained at a pH in the range of about 5.5 to about 6.5. Preservatives are added to maintain stability and to prevent mold and bacteriological deterioration of the product. Pigments may be added to provide a variety of colors for individual preference.

DETAILED DESCRIPTION OF THE PREFERRED EMBODIMENTS

A phosphorescent moldable, stretchable toy gel composition is provided for the entertainment of children. The unusually elastic, yet pliable consistency of the invention is obtained in a water-based composition thickened by guar gum and crosslinked with a borate ion. The relatively high amount of crosslinked guar gum, about 5%, provides a gelled consistency approaching that of a soft, nonsticky dough.

Guar gum is a thickening agent used in industry in numerous applications and is manufactured by grinding guar beans into a fine powder. Certain modifications to these basic guar powders improve their properties for hydration in solutions containing other ingredients such as glycols.

Other modifications can be made which change the rate of hydration in aqueous solutions. The modified guars which have been found to be preferred in this application are hydroxypropyl substituted guars which have stability and viscosity in borate-ion crosslinked gels.

Also, guar gums, which have been modified to hydrate quite slowly are preferred at least in part to allow time for mixing and packaging of the final product. By using a mixture of slow and fast hydrating gums, the proper rate of thickening can be obtained which provides suspension of the phosphorescent particles without being too thick to pour or pump into containers. Hydroxypropyl guars are available from Rhone-Poulenc of Louisville, Kentucky, and from Aqualon, of Houston, Tex.

The phosphorescent pigments used in this invention are metal sulfides which have the ability to quickly absorb light and then emit the light in a colored glow over a period of time. Zinc sulfide is typically used in a proportion with 20 to 50 parts per million of copper sulfide. The manufacturers refer to the copper sulfide as an activator but its actual scientific function is not known. Zinc sulfide glows a green color after exposure to white light. A mixture of 50% zinc sulfide and 50% cadmium sulfide with the copper activator glows an orange-red color, but is not quite as brilliant as the zinc sulfide glow. These pigments are available from United Mineral and Chemical Corp. of Lyndhurst, N.J., and from USR Optonix Inc. of Hackettstown, N.J.

Phosphorescent particles from 20 to 100 microns have been tested and compared as to their efficiency. No noticeable difference was observed in the glow using the same weight percentage over this size range. One advantage in using the small particle sizes is that they remain in suspension better during manufacture of the toy gel composition. The density of the phosphorescent particles is very high and care must be taken to maintain a homogeneous distribution of them during mixing and packaging.

The phosphorescent particles are not soluble in the water-based compositions and lack any significant coloring in daylight. Coloring agents, therefore, must be added to the gel composition to obtain a desired variety of colors for the product. Some colors are very detrimental to the glow from the phosphorescent particles because the color tends to shield the particles from both absorption and emission of light. Dark colors provide too much shielding of the particles and, therefore, a more pastel color assortment is desired.

Also, the colors of blue and green seem to augment the natural green glow of the zinc sulfide particles and such combination actually appears to glow brighter than gels without the added green coloring agents.

Propylene glycol is preferably utilized in the composition as a preservative and also as a dispersing agent to fluidize the guar gum. Also, it is preferable to add paraben preservatives to the propylene glycol since they are more soluble in propylene glycol than in water. The guar gum does not hydrate in propylene glycol and, therefore, disperses evenly. The combination is easily stirred into the water-based solution without lumping. Propylene glycol is an ingredient used in many foods such as extracts and salad dressings and poses no toxicity hazard to children.

Other preservatives which may be used in addition to, or as a substitute for propylene glycol are methyl, ethyl, benzyl, butyl, and propyl parabens (p-hydroxybenzoate), and sodium benzoate which are all used in numerous foods in percentages of up to about 0.1% each.

A borate salt, boric acid, or a combination of these is used in a combined percentage of 0.1% to 1.5% to supply the borate ion for crosslinking the guar gum and also to provide a pH in an acceptable range from about 5.5 to about 6.5. A more preferred range would be a pH in the range from about 5.8 to about 6.2.

It will be appreciated by those skilled in the art that several borate salts will satisfy the requirements of the present invention. By way of example and not limitation, sodium borate, sodium tetraborate, potassium borate, potassium tetraborate or combinations thereof will provide or assist in providing the borate ion. The borate salt presently preferred is sodium borate or sodium tetraborate (borax).

Boric acid and borate salts provide a migrating, rehealable crosslink to guar-thickened gels which is very pH sensitive. Lower pH's cause the mixture to be sticky, and higher pH's cause the mixture to be rubbery and resistent to rehealing. Other products in the formulation and variations thereof affect the pH of the final mixture differently and adjustment must be made in the borax and/or boric acid to maintain the pH at about 6.0.

It will be appreciated that a mild base combined with boric acid may also be used to formulate a composition with a pH within the optimum range. Borate compound concentrations of less than 0.1% are adequate for crosslinking, but more favorable buffering which renders the mixture more stable is obtained with the concentration near 1%.

Other mild acids such as citric or ascorbic acid (Vitamin C) may be substituted for the boric acid and used in combination with borax to adjust the pH of the gel to the optimum level. By way of example and not limitation, other mild acids acceptable for use with the inventive composition include palmitic acid, tartaric acid, ascorbic acid, potassium acid pthalate, and combinations thereof to be used in combination with borax to provide a pH in the range of from about 5.5 to about 6.5. It will be appreciated that owing to the differing effects of each mild acid, varying amounts will be required to achieve a pH in the range from about 5.5 to about 6.5. As used in this specification, the term mild acid applies to any acid capable of adjusting the pH of the composition to the desired pH range. Strong acids in small quantities may also serve as mild acids to provide the composition with the desired pH.

Several methods of manufacture have been used to produce a toy gel composition packaged in a small container. The container is preferably transparent or translucent to allow light through the container so that the gel will be charging with light when it is not in use.

One method of manufacturing the toy gel is to use two separate liquids into which the other ingredients are first added. It is preferable to have a water-based solution containing the borax, boric acid, and some of the preservatives dissolved in the solution. A second liquid, propylene glycol, has dispersed within it the phosphorescent particles and the guar gum. It is necessary to stir the propylene glycol continually to maintain suspension and homogeneity of the second liquid. The water-based solution and propylene glycol suspension are then poured or pumped together and stirred until the gel composition begins to form.

In the case where propylene glycol is not used, or in the case where it is desireable to blend the propylene glycol with the water-based solution, the guar gum and phosphorescent particles can be mixed together dry and added to the water-propylene glycol solution. A dispersable or delayed thickening gum should be used in this case to prevent lumping of the guar gum. The mixture would then be stirred until sufficient thickening was obtained to suspend the particulate matter and then be loaded into the small containers which would be distributed for sale. In this method, preservatives would preferably be added to and dissolved in the solution.

In most cases, it is desirable and preferable to blend two guar gums of different hydration rates. A fast thickening minor proportion of the gum would thicken the mixture quickly to provide suspension and homogeneity during processing and packaging and then later the slower thickening gum as a major proportion would hydrate to form the desired heavily gelled consistency.

Another variation of a method of manufacturing is to blend the phosphorescent particles, guar gum, coloring agents, borax and boric acid and dry preservatives into a dry premix which can be added to tap water. This variation would allow the consumer to mix the composition.

The disclosure above generally describes the present invention. A more complete understanding may be obtained by reference to the following specific examples.

EXAMPLES

Numerous experimental mixes were made using various types and concentrations of ingredients. Some of these are recital below:

EXAMPLE NO. 1

| Water-based Solution | (grams) | Glycol Solution | (grams) |
|---|---|---|---|
| Water | 72.0 | Propylene glycol | 20.0 |
| Boric Acid | 0.9 | Aqualon 411D HP Guar | 5.0 |
| Borax | 0.2 | Phosphorescent pigment 2330 | 2.0 |
| Sodium Benzoate | 0.1 | | |
| Methyl Paraben | 0.08 | | |
| Propyl Paraben | 0.02 | | |
| Color | trace | | |

The above liquids were stirred together and mixed with a spoon for about two minutes at which time thickening began to occur. After standing overnight, a gel resulted with an excellent stretchable consistency. Aqualon 411D HP Guar is a delayed-hydrating hydroxypropyl guar gum. Phosphorescent pigment 2330 is a zinc sulfide based product from USR Optonix.

The parabens were very slow to dissolve in the water solution, and some white residue remained after several hours of stirring. The other ingredients of the water-based solution dissolved quickly.

EXAMPLE NO. 2

In order to accelerate the dissolution of the parabens, the same ingredients of Example 1 were blended, except the parabens were dissolved into the propylene glycol rather than the water solution as follows:

| Aqueous Solution | (parts) | Glycol Solution | (parts) |
|---|---|---|---|
| Water | 72.0 | Propylene glycol | 20.0 |
| Borax | 0.2 | Methyl Paraben (MP) | 0.08 |
| Boric Acid | 0.9 | Propyl Paraben (PP) | 0.02 |
| Sodium Benzoate | 0.1 | Aqualon 411D HP Guar | 5.0 |
| | | Phosphorescent Pigment 2330 | 2.0 |

The parabens dissolved quite quickly in the glycol solution and then the glycol solution was stirred to uniformly distribute the guar gum and pigment. It was then blended into the water solution. Sufficient thickening occurred within a few minutes to suspend the solids, and after several hours, an excellent gelled consistency was obtained. The pH of the mixture was about 6.0

EXAMPLE NO. 3

| Aqueous Solution | (parts) | Glycol Solution | (parts) |
|---|---|---|---|
| Water | 72.0 | Propylene glycol | 20.0 |
| Borax | 0.15 | Rhone-Poulenc 8550 | 5.0 |
| Boric Acid | 0.9 | Phosphorescent Pigment 2330 | 2.0 |
| Sodium Benzoate | 0.1 | | |
| Parabens (4MP/1PP) | 0.1 | | |

Rhone-Poulenc 8550 is a longer-delayed hydrating hydroxypropyl guar. The above mixture began to thicken after about 30 minutes and obtained an excellent gel consistency after several hours. The mix was stirred occasionally during the first 30 minutes to maintain a uniform blend.

EXAMPLE NO. 4

| Aqueous Solution | (parts) | Glycol Solution | (parts) |
|---|---|---|---|
| Water | 72.0 | Propylene glycol | 20.0 |
| Borax | 0.15 | Rhone-Poulenc 8550 | 4.0 |
| Boric Acid | 0.9 | Rhone-Poulenc 8000 | 1.0 |
| Sodium Benzoate | 0.1 | Phosphorescent Pigment 2330 | 2.0 |
| Parabens (4MP/1PP) | 0.1 | | |

Rhone-Poulenc 8000 is a hydroxypropyl guar which thickens quite fast. After blending of the above liquids, the mixture thickened after about 2 minutes to the point where the solids would remain in suspension. At 30 minutes the slower gum began to thicken and an excellent gelled consistency was obtained after a few hours.

EXAMPLE NO. 5

| Aqueous Solution | (parts) | Glycol Solution | (parts) |
|---|---|---|---|
| Water | 72.0 | Propylene glycol | 20.0 |
| Borax | 0.2 | Aqualon 411D HP Guar | 4.5 |
| Boric Acid | 0.9 | Aqualon 411 HP Guar | 0.5 |
| Sodium Benzoate | 0.1 | Phosphorescent Pigment 2330 | 3.0 |
| Parabens (4MP/1PP) | 0.1 | | |
| Blue Color | trace | | |

Aqualon 411 Guar is a hydroxypropyl guar which thickens very fast. A mixture of the above recited solutions thickened quickly to suspend the solids and remained pourable for about 5 minutes. An excellent gelled consistency was obtained after several hours, which glowed brightly after exposure to light. The blue color and the extra glow particles improved the brightness of the emitted light.

EXAMPLE NO. 6

| Aqueous Solution | (parts) | Glycol Solution | (parts) |
|---|---|---|---|
| Water | 72.0 | Propylene glycol | 20.0 |
| Borax | 0.075 | Aqualon 411D HP Guar | 5.0 |
| Boric Acid | 0.2 | Phosphorescent Pigment 2330 | 2.0 |
| Sodium Benzoate | 0.1 | | |

A mixture of the above liquids which contained less borate compound thickened in a few minutes and formed an excellent gel consistency after a few hours.

EXAMPLE NO. 7

| Aqueous Solution | (parts) | Glycol Solution | (parts) |
|---|---|---|---|
| Water | 82.0 | Propylene glycol | 10.0 |
| Borax | 0.2 | Aqualon 411D HP Guar | 5.0 |
| Boric Acid | 1.0 | Phosphorescent Pigment 2330 | 2.0 |

The above liquids were mixed and formed an excellent gel consistency. After several months of storage, however, some mold was noticed in the mixture. The improvement in storage life with the use of preservatives is thus shown.

EXAMPLE NO. 8

| Aqueous Solution | (parts) | Dry Mixture | (parts) |
|---|---|---|---|
| Water | 72.0 | Aqualon 411D HP Guar | 5.0 |
| propylene glycol | 20.0 | Phosphorescent Pigment 2330 | 2.0 |
| Borax | 0.2 | | |
| Boric Acid | 0.9 | | |
| Sodium Benzoate | 0.1 | | |
| Propyl Paraben | 0.1 | | |

The propyl paraben in the above solution was first mixed with the propylene glycol where it readily dissolved. The water was then added, followed by the other ingredients. With the addition of the dry component, the mixture became quite curdley for about 4 minutes. Good thickening began to occur at that time. An excellent gel resulted in a few hours which was identical to the two-liquid method of manufacture.

EXAMPLE NO. 9

| Aqueous Solution | (parts) | Glycol Solution | (parts) |
|---|---|---|---|
| Water | 67.0 | Propylene glycol | 20.0 |
| Boric Acid | 0.9 | Propyl Paraben | 0.1 |
| Sodium Benzoate | 0.1 | Aqualon 411D HP Guar | 10 |
| | | Phosphorescent Pigment 2330 | 2.0 |

The above mixture of the two solutions quickly formed a much more viscous gel than the formulations using 5 parts guar, yet still exhibited the desired traits.

EXAMPLE NO. 10

| Aqueous Solution | (parts) | Glycol Solution | (parts) |
|---|---|---|---|
| Water | 74.0 | Propylene glycol | 20.0 |
| Borax | 0.2 | Propyl paraben | 0.1 |
| Boric Acid | 0.9 | Aqualon 411D HP Guar | 3.0 |
| Sodium Benzoate | 0.1 | Phosphorescent Pigment 2330 | 2.0 |

The above blend of liquids resulted in an excellent toy gel which was much softer than that obtained using 5 parts gum.

EXAMPLE NO. 11

This sample was made blending all of the dry ingredients and mixing them with water as follows:

| Dry Ingredients | (grams) |
|---|---|
| Phosphorescent Pigment 2330 | 2.0 |
| Aqualon 411D HP Guar | 5.0 |
| Boric Acid | 1.0 |
| Sodium Benzoate | 0.1 |
| Propyl Paraben | 0.04 |
| Blue Color | Trace |

The above mixture without borax was added to 92 grams of water and shook in a small plastic cup with a lid. Some curdling occurred for a few minutes, but the mixture became smooth after a few minutes of shaking. In a few hours, a gel of excellent consistency resulted.

EXAMPLE NO. 12

| Aqueous Solution | (parts) | Glycol Solution | (parts) |
|---|---|---|---|
| Water | 78.2 | Propylene glycol | 15.0 |
| Borax | 0.1 | Propyl Paraben | 0.1 |
| Boric Acid | 0.5 | Aqualon 411D HP Guar | 4.0 |
| Sodium Benzoate | 0.1 | Phosphorescent Pigment 2330 | 2.0 |

The above mixture of solutions with less propylene glycol and guar gum made a gel exhibiting a softer consistency than when 5% guar gum was used.

EXAMPLE NO. 13

| Aqueous Solution | (parts) | Glycol Solution | (parts) |
|---|---|---|---|
| Water | 74.0 | Propylene glycol | 20.0 |
| Borax | 0.3 | Propyl Paraben (PP) | 0.1 |
| Citric Acid | 0.1 | Aqualon 411D HP Guar | 5.0 |
| Sodium Benzoate | 0.1 | Pigment 2330 | 2.0 |

A mixture of the above solutions resulted in an excellent gelled consistency. The combination of borax and citric acid provide a pH of about 6.0 for the final mixture.

EXAMPLE NO. 14

| Aqueous Solution | (parts) | Glycol Solution | (parts) |
|---|---|---|---|
| Water | 74 | Propylene glycol | 20 |
| Borate Salt | 0.3 | Propyl Paraben (PP) | 0.1 |
| Mild Acid | 0.1 | Aqualon 411D HP Guar | 5.0 |
| Sodium Benzoate | 0.1 | Pigment 2330 | 2.0 |

A mixture of the above solutions will result in an excellent gelled consistency with a pH of about 6.0.

The present invention is not limited in scope by the examples which are intended as illustrations of one aspect of the invention. Indeed, various modifications of the invention in addition to those shown and described herein will become apparent to those skilled in the art from the foregoing description, such modifications are intended to fall within the scope of the appended claims.

What is claimed and desired to be secured by United States Letters Patent is:

1. A method for formulating a phosphorescent toy gel composition, comprising the steps:
   (a) providing a water-based solution with a borate ion-containing compound dissolved in the water;
   (b) providing guar gum and phosphorescent particles suspended and dispersed in propylene glycol; and
   (c) mixing the water-based solution with the propylene glycol dispersion in a proportion to provide a phosphorescent gel composition comprising from about 50 percent to about 90 percent water, from about 10 percent to about 30 percent propylene glycol, from about 1 percent to about 10 percent phosphorescent particles, and from about 2 percent to about 10 percent guar gum.

2. A method for formulating a phosphorescent toy gel as recited in claim 1, wherein the composition further comprises a preservative.

3. A method for formulating a phosphorescent toy gel composition as recited in claim 2, wherein the preservative is selected from the group consisting of sodium benzoate, methyl paraben, ethyl paraben, propyl paraben, butyl paraben, benzyl paraben, sorbic acid, benzoic acid, potassium sorbate, or combinations thereof.

4. A method for formulating a phosphorescent toy gel composition as recited in claim 2, wherein the preservative is dissolved in the water-based solution.

5. A method for formulating a phosphorescent toy gel composition as recited in claim 2, wherein the preservative is dissolved in the propylene glycol.

6. A method for formulating a phosphorescent toy gel composition as recited in claim 1, wherein the borate ion-containing compound comprises boric acid.

7. A method for formulating a phosphorescent toy gel composition as recited in claim 1, wherein the borate ion-containing compound comprises a borate salt.

8. A method for formulating a phosphorescent toy gel composition as recited in claim 1, wherein the borate ion-containing compound is comprised of a borate salt, and a mild acid is included to provide a composition with a pH in the range from about 5.5 pH to about 6.5 pH.

9. A method for formulating a phosphorescent toy gel composition as recited in claim 8, wherein the borate salt is selected from the group consisting of sodium borate, sodium tetraborate, potassium borate, potassium tetraborate, or combinations thereof.

10. A method for formulating a phosphorescent for toy gel composition as recited in claim 8, wherein the mild acid is selected from the group consisting of palmitic acid, citric acid, tartaric acid, ascorbic acid, boric acid, potassium acid pthalate, or combinations thereof.

11. A method for formulating a phosphorescent toy gel composition as recited in claim 1, wherein the borate ion-containing compound is present in the range comprising about 0.1 percent to about 2 percent of the composition.

12. A method for formulating a phosphorescent toy gel composition as recited in claim 1, wherein the pH of the composition is about 6.0.

13. A method for formulating a phosphorescent toy gel composition as recited in claim 1, wherein the guar gum comprises a natural guar.

14. A method for formulating a phosphorescent toy gel composition as recited in claim 1, wherein the guar gum comprises a hydroxypropyl guar.

15. A method for formulating a phosphorescent toy gel composition as recited in claim 1, wherein the guar gum comprises a modified guar gum to provide a slow hydration rate.

16. A method for formulating a phosphorescent toy gel composition as recited in claim 1, wherein the guar gum comprises a mixture of slow and fast hydrating guars.

17. A method for formulating a phosphorescent toy gel composition as recited in claim 1, wherein the phosphorescent particles comprise at least one metal sulfide.

18. A method for formulating a phosphorescent toy gel composition as recited in claim 17, where the metal sulfides are selected from the group consisting of zinc sulfide, copper sulfide, cadmium sulfide, or combinations thereof.

19. A method for formulating a phosphorescent toy gel composition as recited in claim 1, wherein the size of the phosphorescent particles is within the range comprising about 10 microns to about 100 microns.

20. A method for formulating a phosphorescent toy gel composition comprising the steps:

(a) providing a water based solution which contains propylene glycol and a borate ion-containing compound dissolved in the solution;

(b) providing a dry mixture of guar gum and phosphorescent particles; and (c) mixing the water-based solution with the dry mixture in a proportion to provide a gel composition comprising from about 50 percent to about 97 percent water, from 0 percent to about 30 percent propylene glycol, from about 1 percent to about 10 percent phosphorescent particles, and from about 2 percent to about 10 percent guar gum.

21. A method for formulating a phosphorescent toy gel composition as recited in claim 20, wherein the composition further comprises a preservative.

22. A method for formulating a phosphorescent toy gel composition as recited in claim 21, wherein the preservative is selected from the group consisting of sodium benzoate, methyl paraben, ethyl paraben, propyl paraben, butyl paraben, benzyl paraben, sorbic acid, benzoic acid, potassium sorbate, or combinations thereof.

23. A method for formulating a phosphorescent toy gel composition as recited in claim 20, wherein the preservative is contained in the water-based solution.

24. A method for formulating a phosphorescent toy gel composition as recited in claim 20, wherein the preservative is included in with the dry mixture.

25. A method for formulating a phosphorescent toy gel composition as recited in claim 20, wherein the borate ion-containing compound comprises boric acid.

26. A method for formulating a phosphorescent toy gel composition as recited in claim 20, wherein the borate ion-containing compound comprises a borate salt.

27. A method for formulating a phosphorescent toy gel composition as recited in claim 20, wherein the borate ion-containing compound is comprised of a borate salt, and a mild acid is included to provide a composition with a pH in the range from about 5.5 pH to about 6.5 pH.

28. A method for formulating a phosphorescent toy gel composition as recited in claim 26, wherein the borate salt is selected from the group consisting of sodium borate, sodium tetraborate, potassium borate, potassium tetraborate or combinations thereof.

29. A method for formulating a phosphorescent for toy gel composition as recited in claim 27, wherein the mild acid is selected from the group consisting of palmitic acid, citric acid, tartaric acid, ascorbic acid, boric acid, potassium acid pthalate, or combinations thereof.

30. A method for formulating a phosphorescent toy gel composition as recited in claim 20, wherein the borate ion-containing compound is present in the range from about 0.1 percent to about 2 percent of the composition.

31. A method for formulating a phosphorescent toy gel composition as recited in claim 20, wherein the pH of the final composition is in the range of about 5.5 to about 6.5.

32. A method for formulating a phosphorescent toy gel composition as recited in claim 20, wherein the guar gum comprises a natural guar.

33. A method for formulating a phosphorescent toy gel composition as recited in claim 20, wherein the guar gum comprises a hydroxypropyl guar.

34. A method for formulating a phosphorescent toy gel composition as recited in claim 20, wherein the guar gum is modified to provide a slow hydration rate.

35. A method for formulating a phosphorescent toy gel composition as recited in claim 20, wherein the guar gum comprises a mixture of slow and fast hydrating guars.

36. A method for formulating a phosphorescent toy gel composition as recited in claim 20, wherein the phosphorescent particles comprise at least one metal sulfide.

37. A method for formulating a phosphorescent toy gel composition as recited in claim 20, wherein at least one metal sulfide is selected from the group consisting of zinc sulfide, copper sulfide, and cadmium sulfide.

38. A method for formulating a phosphorescent toy gel composition as recited in claim 20, wherein the size of the phosphorescent particles is within the range from about 10 microns to about 100 microns.

* * * * *